United States Patent [19]

Geiger et al.

[11] 4,351,281

[45] Sep. 28, 1982

[54] METHOD AND SYSTEM FOR OPERATION OF A SPARK-IGNITED INTERNAL COMBUSTION ENGINE

[75] Inventors: Istvan Geiger; Heinz Theuerkauf, both of Brunswick; Klaus Stamm, Wolfsburg, all of Fed. Rep. of Germany

[73] Assignee: Volkswagenwerk Aktiengesellschaft, Wolfsburg, Fed. Rep. of Germany

[21] Appl. No.: 244,868

[22] Filed: Mar. 18, 1981

Related U.S. Application Data

[63] Continuation-in-part of Ser. No. 170,766, Jul. 21, 1980.

[30] Foreign Application Priority Data

| Jul. 27, 1979 [DE] | Fed. Rep. of Germany | 2930540 |
| Mar. 25, 1980 [DE] | Fed. Rep. of Germany | 3011332 |
| Jul. 19, 1980 [DE] | Fed. Rep. of Germany | 3027532 |

[51] Int. Cl.³ ............... F02P 5/04; F02P 5/14; F02P 11/02; F02B 3/00
[52] U.S. Cl. .................. 123/425; 123/418; 123/435; 123/436
[58] Field of Search ........... 123/425, 411, 418, 419, 123/435, 436, 440; 364/431

[56] References Cited

U.S. PATENT DOCUMENTS

| 4,002,155 | 1/1977 | Harned et al. | 123/425 |
| 4,099,493 | 7/1978 | Lasdeh et al. | 123/436 |
| 4,116,175 | 9/1978 | Sand | 123/425 |
| 4,120,272 | 10/1977 | Douaud et al. | 123/425 |
| 4,130,095 | 12/1978 | Bowler et al. | 60/276 |
| 4,207,847 | 6/1980 | Haddori et al. | 123/418 |
| 4,240,388 | 12/1980 | Omori et al. | 123/435 |
| 4,269,154 | 5/1981 | Iwada et al. | 123/425 |

FOREIGN PATENT DOCUMENTS

| 22159 | 1/1981 | European Pat. Off. | 123/425 |
| 54-162031 | 12/1979 | Japan | 123/425 |

Primary Examiner—Raymond A. Nelli
Attorney, Agent, or Firm—Brumbaugh, Graves, Donohue & Raymond

[57] ABSTRACT

A method and device for adjusting the timing of an internal combustion engine in response to knocking are provided. In the method, knocking signals are generated when the engine knocks and the timing is too far advanced. First correctional signals are generated in response to the knocking signals and adjust at one speed range one of several control curves. Second correctional signals are generated from the first correctional signals to adjust the control curves at the remaining speed ranges. The timing of the engine is retarded in response to the adjusted control curves until the knocking disappears. The system for adjusting the ignition timing comprises a knocking sensor, an ignition computer storing several control curves and generating ignition timing correction signals, a counter for generating signals to the ignition computer to change the control curves, a logic unit for receiving signals from the ignition computer and the knocking sensor and generating correction signals, and an interconnection device for adjusting the timing of the internal combustion engine in response to the ignition correction signals.

16 Claims, 7 Drawing Figures

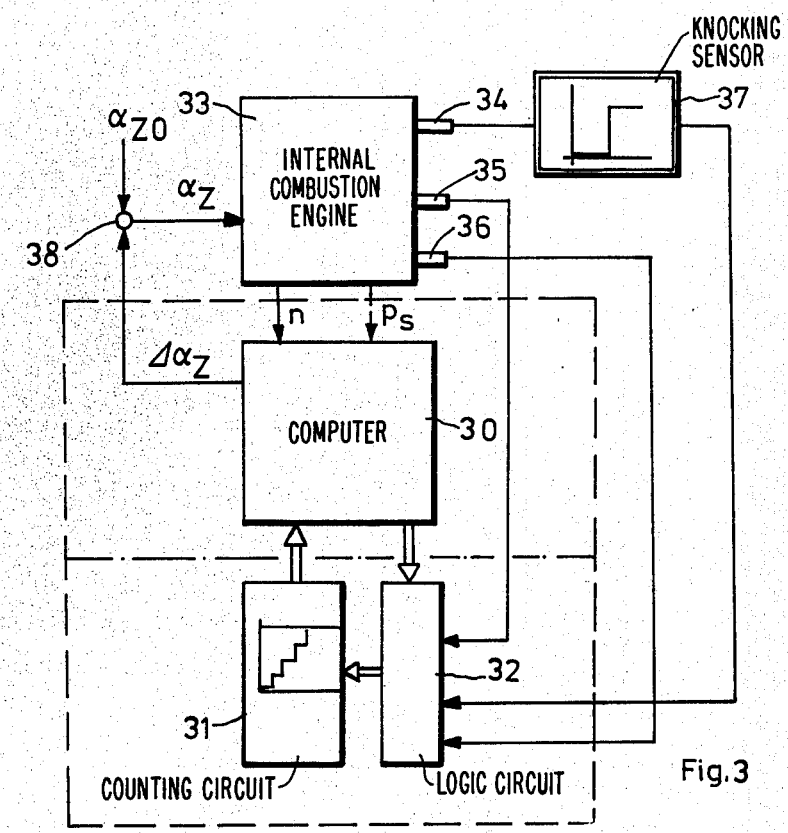
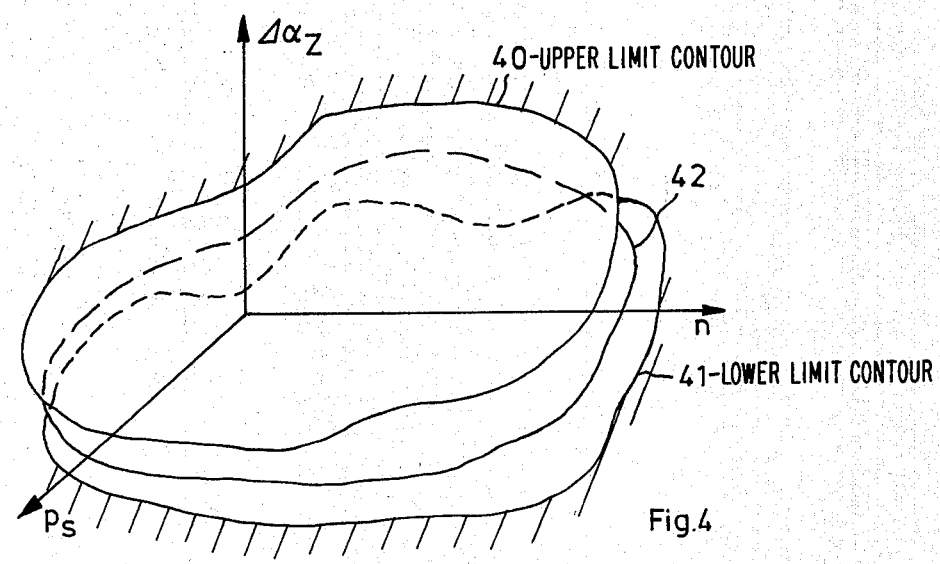

METHOD AND SYSTEM FOR OPERATION OF A SPARK-IGNITED INTERNAL COMBUSTION ENGINE

REFERENCE TO RELATED APPLICATIONS

This is a continuation-in-part of copending application Ser. No. 170,766, filed July 21, 1980, and incorporated herein by reference.

BACKGROUND OF THE INVENTION

In our copending application Ser. No. 170,766, a method and apparatus for controlling the operation of a spark ignited internal combustion engine is described. In particular, the apparatus uses a knocking sensor to operate a correction signal generating apparatus in accordance with the detection of engine knocking for various engine speeds.

It is a purpose of the present invention to further develop the invention of our copending application, and particularly to optimize the generation of timing correction signals.

In our copending application there is described an apparatus wherein knocking signals are detected when the engine is operated at each of a plurality of engine speeds. The knocking signals are separately supplied to counting circuits. The value stored in the counting circuits is used for the generation of correction signals, which are combined with engine timing adjustment signals generated in an engine timing computer to correct the timing adjustment signals to avoid the occurence of engine knock. The correction signals for each operating speed of the engine are independently obtained by the detection of knocking at that particular speed range.

The invention in accordance with our copending application provides the possibility of using a control curve in the engine timing adjustment computer, which is optimized for engine operation without any attention being paid to the occurence of engine knocking. Further, the disadvantage of previous knocking control systems, wherein a saw-tooth of ignition timing is provided in response to the detecting of engine knocking is avoided. In accordance with the invention of our copending application, the control curve of the ignition timing adjustment computer is achieved advantageously with a view towards conditions actually prevailing in the engine to avoid the knocking limit, as determined by actual engine response.

As indicated in our copending application, there may occur engine speed values within the operating range of the engine at which it is difficult to acquire the necessary signals of the knocking sensor in order to derive the correction signal required for the particular speed range. Accordingly, we have described obtaining a relatively small number of correction signals, each of which is determined at a particular speed value.

It is a purpose of the present invention to provide an embodiment of the invention in our copending application, which makes it possible to obtain correction signals usable over the entire speed range of operation and which are derived by detection of knocking signals at only one particular speed range of the engine. Thus it is possible by evaluation of knocking signals in a particular speed range to derive correction signals for other speed ranges which may be otherwise difficult to obtain.

SUMMARY OF THE INVENTION

In accordance with the present invention there is provided a method for operating a spark ignited internal combustion engine wherein an engine timing adjustment signal is generated as a function of engine operating conditions, and wherein a timing correction signal is generated for each of a plurality of engine speed ranges in response to engine knocking. The correction signal is to be combined with the adjustment signal to provide a combined signal which supplies an engine timing to prevent engine knocking. In accordance with the present invention, the correction signal for a first selected speed range is generated in response to engine knocking and the correction signals for the remaining speed ranges are derived from the correction signal for the first selected speed range.

In one example, the correction signal for the first selected speed range is selected from a first predetermined set of fixed correction signals in response to engine knocking. The correction signal for the remaining speed ranges are selected from corresponding sets of fixed correction signals, each of the sets having the same number of fixed correction signals and each of the sets being associated with one of the speed ranges. According to another embodiment of the invention, the correction signals for each of the speed ranges have a predetermined range of correction signal values, including minimum and maximum signal values. The correction signals for the remaining speed ranges are selected to have the same ratio to the corresponding minimum and maximum values as the correction signal for the first selected speed range.

In accordance with the invention, there is provided a system for adjusting the ignition timing of an internal combustion engine in response to knocking. The system includes a knocking sensor for generating knocking signals when the internal combustion knocks. Also provided is an ignition computer, which is responsive to supplied signals representative of engine operating conditions, including speed. The computer is also responsive to supplied correction control signals and generates ignition timing adjustment signals. The adjustment signals include a timing correction derived from the correction control signals. There is also provided a counter for generating the correction control signals in response to counting signals. Logic means are provided which respond to the knocking signals and generate the counting signals for the counter. Finally there is provided means which are responsive to the adjustment signals for adjusting the ignition timing.

In one embodiment, the supplied signals representative of engine operating conditions include signals representative of intake manifold pressure. The computer has stored sets of values of timing adjustment signals including the timing corrections for each value of the correction control signals. The computer selects the ignition timing adjustment signals according to the speed and pressure representative signals for each supplied value of the correction control signal. The speed representative signal and an engine temperature representative signal may be supplied for the logic means and the logic means may be arranged to generate counting signals in response to temperature and speed signals to correct ignition timing and thereby stabilize the idle speed of the engine when the idle drops below a preset idle speed. The logic means may also be arranged to suppress generation of counting signals in response to knocking signals or temperature signals at speeds above the idle speed and below a selected speed so that the correction control signal is unchanged when the engine operates in that speed range.

The present invention also relates to a method for operating a spark ignited internal combustion engine, wherein an engine timing adjustment signal is generated as a function of engine operating conditions and wherein a timing correction signal is generated in response to engine knocking. The correction signal is combined with the adjustment signal to prevent engine knocking. In accordance with the invention the generated value of the correction signal is maintained constant until the engine temperature changes by a selected amount, whereupon a new value for the correction signal is generated.

The temperature of the engine is preferably taken in the cylinder head of the engine.

The present invention also relates to a system for controlling ignition timing of an internal combustion engine to prevent engine knocking, wherein there are provided means responsive to an engine knocking signal for generating an ignition timing correction signal. In accordance with the invention, there is provided means responsive to engine temperature for providing a temperature change control signal upon a predetermined magnitude of engine temperature change. The correction signal generating means generates an updated correction signal in response to the temperature change correction signal.

One feature of the method and apparatus of the present invention is that it is easily implemented using conventional and known logic components.

In our copending application, it was noted that the timing correction signal should be updated at definite time intervals. The application suggests that the updating of the correction signal might occur upon the stopping and restarting of an engine. According to one aspect of the present invention, the timing of the updating of the timing correction signals, by resensing of the knocking limits of engine performance, occurs in response to a modification of engine operating condition, particularly engine temperature.

This aspect of the invention uses the fact that the engine knocking limit, that is, the value of the ignition angle at which knocking will occur, is a function of the temperature of the engine, in particular the temperature of the cylinder head. The higher this cylinder head temperature, the later the ignition timing corresponding to the knocking limit. At lower engine temperatures, the knocking limit will move in the direction toward advanced timing. For use in connection with an automobile engine, the temperature, for example, on transition between different travel conditions, for example city or highway driving, may change by a value which requires the redetermination of the timing correction signals.

For a better understanding of the present invention, together with other and further objects, reference is made to following description, taken in conjunction with the accompanying drawings, and its scope will be pointed out in the appended claims.

BRIEF DESCRIPTION OF THE DRAWINGS

FIG. 3 is a block diagram showing an apparatus in accordance with the present invention for the control of ignition timing;

FIG. 4 is a three dimensional graph illustrating limitation contours and control contours in accordance with the method of the present invention;

DESCRIPTION OF THE INVENTION

Figure 1:
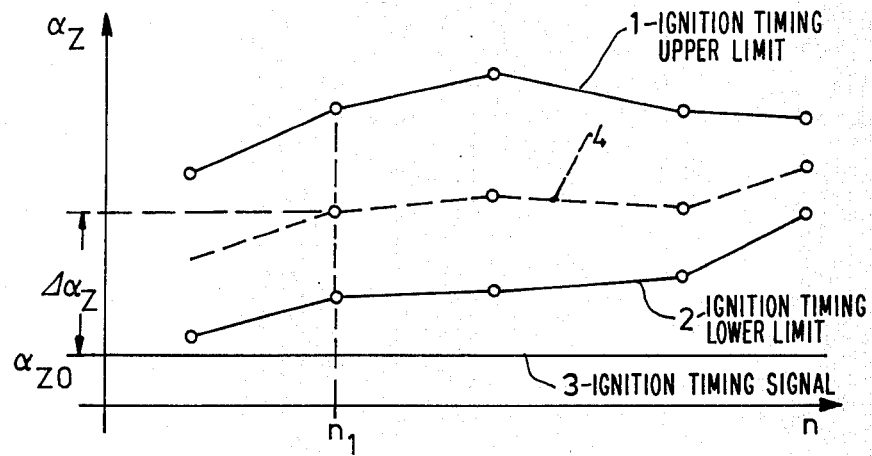
FIG. 1 is a graph indicating ignition timing and ignition timing adjustment in accordance with the present invention.

With reference to FIG. 1, there is shown a graph of ignition timing as a function of engine speed n. The ignition angle $\alpha_{zo}$ is the basic ignition timing produced by the ignition distributor. Curve 1 indicates an upper limit of ignition timing, while Curve 2 indicates a lower limit of ignition timing. At a selected speed, designated $n_1$, the knocking of the engine is evaluated and, in accordance with the determination of the amount of engine knocking, as described in the inventors' copending application, a correction signal $\Delta\alpha_z$ is arrived at for correcting ignition timing at engine speed $n_1$. The determination of the correction required at speed $n_1$ provides a defined ratio of the distance of the resulting ignition angle at speed $n_1$ between the values at that speed for limit curves 1 and 2. For the remaining engine speed ranges, corresponding correction signals are determined by interpolation between the limit curves 1 and 2 to thereby obtain a correction for the basic ignition timing signal 3 which provides the corrected control curve 4 which has the same ratio to limit values 1 and 2 as the ratio defined at the selected speed $n_1$. Accordingly, by using the principles of the curves shown in FIG. 1 it is possible to mathematically arrive at correction signals for the ignition timing for the entire range of engine speeds by interpolation from the control signals determined at a single selected speed. Accordingly, it is unnecessary to evaluate the knocking performance of the engine at the various speeds.

Figure 2:
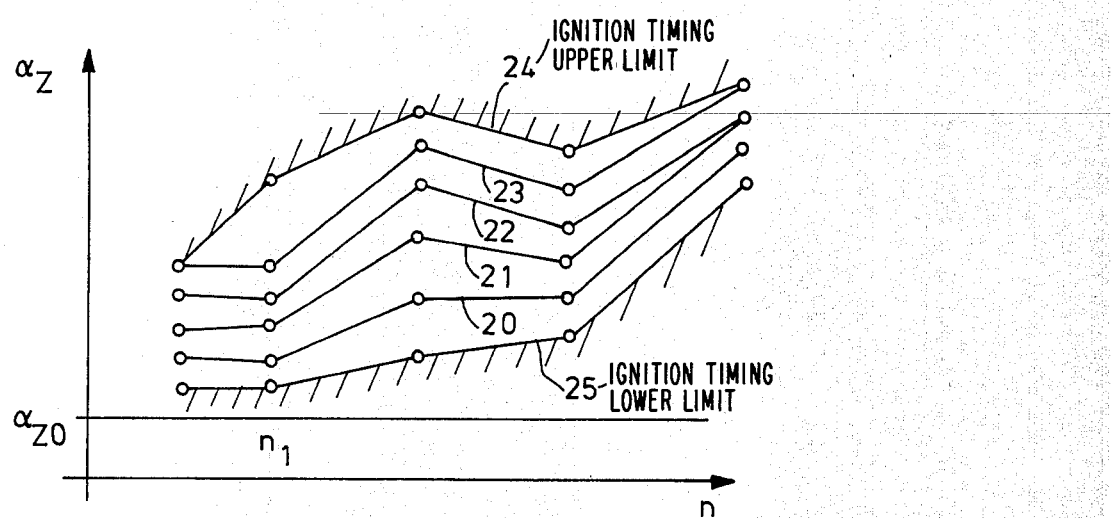
FIG. 2 is a graph showing ignition timing adjustment according to another embodiment of the present invention.

The curves illustrated in FIG. 2 demonstrate an alternate technique for using the determination of the correction signal at one speed $n_1$ for arriving at correction signals for the remaining speeds in the range of engine operation. According to the method as illustrated in FIG. 2, there are provided a plurality of control curves 20, 21, 22 and 23, which are arranged between limiting value curves 24 and 25 for values of ignition timing. One of the curves 20–23 is selected according to the detection of engine knocking at engine speed $n_1$. For the remaining engine speeds, the value of ignition adjustment is determined by use of the same curve. Accordingly, by the detection of knocking, a value for the correction signal is selected from a set of such values for engine speed $n_1$, and the correction signals for the remaining speed ranges are selected from corresponding sets of fixed correction signals, each of the sets having the same number of fixed correction signals and each being associated with a particular speed range.

FIG. 3 is a block diagram of a system for carrying out the methods described with respect to FIG. 1 and FIG. 2. The system of FIG. 3 includes an ignition computer 30, a logic circuit 32 and a counter 31. The internal combustion engine 33 includes a knocking sensor 34, a temperature sensor 35 and a throttle valve sensor 36. In connection with the engine there are also generated signals corresponding to engine speed n and to intake manifold pressure $P_s$, which are provided to ignition computer 30. A circuit 37 is provided for evaluating the output of the engine knocking detector 34 and providing a signal to logic circuit 32 indicating the occurence of engine knocking. Logic circuit 32 is also provided with signals corresponding to engine temperature and possibly signals corresponding to the throttle valve sensor 35. Logic circuit 32 may also be provided with engine speed signals from ignition computer 30. The signals provided to logic circuit 32 are evaluated and the logic circuit provides counting signals to counter 31 to increase or decrease the count contained therein. The counting circuit may either be an up-down counter or a component of a micro-processor.

Ignition computer 30 has stored therein values corresponding to the various sets of correction signals for the different speed values as indicated in FIG. 2. These stored signals represent the correction signals $\Delta\alpha_z$ plotted against the engine speed.

The ignition computer may also respond, as shown in FIG. 3, to intake manifold pressure. Accordingly, it would also contain values for different correction signals as a function of intake manifold pressure. These signals would represent contours in a three dimensional coordinate system of the type illustrated in FIG. 4. The illustration includes an upper limit contour 40 and a lower limit contour 41. Only one intermediate contour, designated 42, is illustrated in FIG. 4, but those skilled in the art will understand that a selected number of such contours, portions of which are illustrated in FIG. 2 would most likely be provided. The output of counting circuit 31, which represents a correction control signal, selects one of the contours 42 for determination of the variations in the correction signal and therefore the variations in the timing adjustment signal provided to combining unit 38 in the embodiment of FIG. 3. According to which correction control signal is supplied by a counter 31, computer 30 will select a contour 42 and, in accordance with the engine speed and intake manifold pressure signals supplied from the engine to the ignition computer 30, will select a point on the contour which represents the appropriate ignition adjustment signal.

The ignition timing signal from the distributor $\alpha_{zo}$ is supplied to combining element 38 along with the ignition timing adjustment signal determined by ignition computer 30, which are combined and provided as an ignition timing signal to the internal combustion engine 33.

Figure 5:
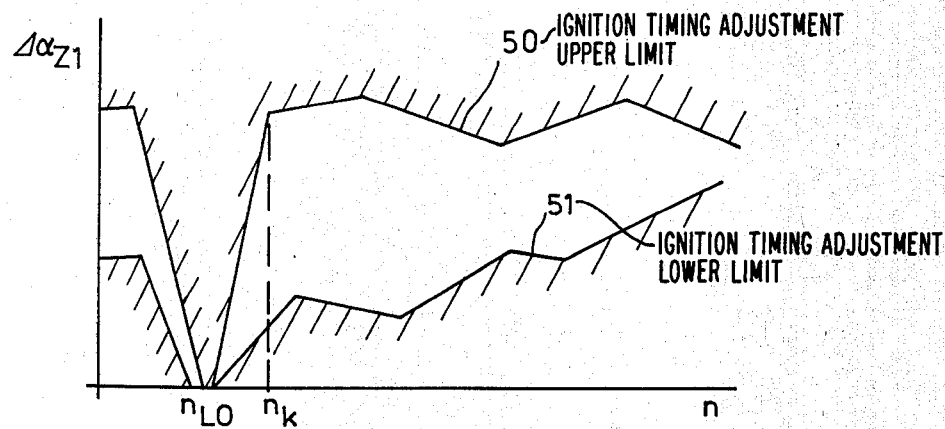
FIG. 5 is a graph indicating ignition timing adjustment as a function of engine speed in accordance with one embodiment of the present invention.
Figure 6:
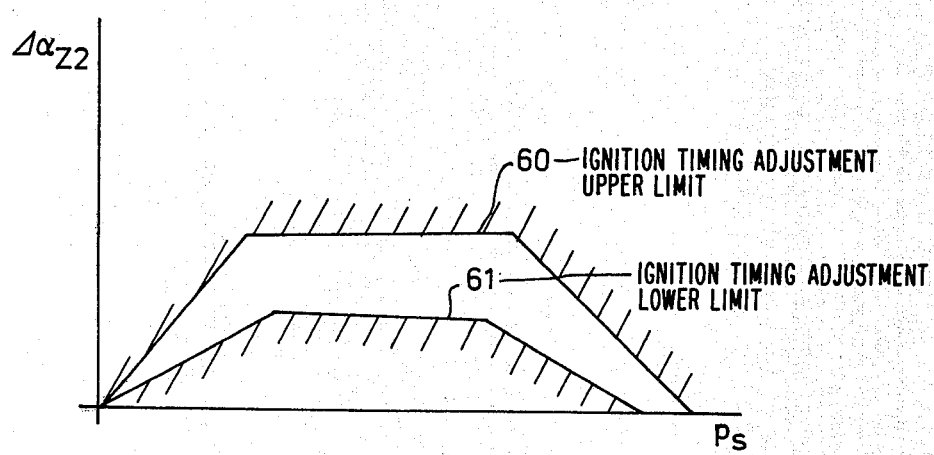
FIG. 6 is a graph showing ignition timing correction as a function of manifold pressure in accordance with the present invention.

Since ignition control computer 30 has stored therein curves which are representative of engine performance characteristics, the timing adjustment signal generated therein is selected according to the influence of intake manifold pressure, which is representative of engine load, and the engine speed signal. FIGS. 5 and 6, which are curves of component correction signals for engine speed and manifold pressure, indicate that both of these timing adjustment components include upper limits and lower limits. For example, the timing adjustment component, which is a function of engine speed illustrated in FIG. 5, has an upper limit 50 and a lower limit 51. Likewise the timing adjustment component which is a function of manifold pressure has an upper limit 60 and a lower limit 61. The contours of the control signals which are selected by the ignition computer 30 lie between the contours of these component correction signal limits.

With reference to the graphs of FIGS. 4, 5, and 6, the apparatus shown in FIG. 3 operates according to the following description. When the internal combustion engine is started, counter 31 is set to provide a correction control signal to ignition computer 30 which selects values for ignition timing adjustment which are optimum for engine operation, disregarding the possibility of engine knocking. In the event the engine speed falls below an idle speed $n_{10}$, ignition computer 30 provides spark advancement to achieve idle adjustment. The idling stabilization and timing adjustment are optimized for engine temperature as determined by sensor 35 from counts supplied to counter 31 by a logic circuit 32. A greater advance in ignition timing may be provided where the engine temperature is lower.

When the engine is operating in a speed range above idle and up to a selected value, indicated as $n_k$ in FIG. 5, signals representative of engine temperature and knocking are suppressed in logic circuit 32 so that the previously selected corrected control signal from counter 31 continues to be supplied to ignition computer 30.

When the engine is operated at speeds above the selected value $n_k$, knocking signals from sensor 34 are supplied to logic circuit 32, which supplies appropriate counts to counter 31 to cause a change in the correction control signal supplied to ignition computer 30. Accordingly, ignition computer 30 selects a different set of values for ignition timing adjustment to adjust the ignition timing to avoid knocking.

In the embodiment shown in FIG. 3, a resetting of the correction control signal occurs when there is a significant change in engine temperature. Thus, when logic circuit 32 detects a change of a selected differential magnitude in engine temperature, it will activate counter 31 in a manner which will cause an appropriate resetting of the correction control signal supplied to ignition computer 30.

In the event counter 31 supplies correction control signals to ignition computer 30 which would call for ignition timing adjustment signals equal to either the upper or the lower limits as indicated by contours 40 and 41 in FIG. 4 or as indicated by curves 50, 51, 60 and 62 in FIGS. 5 and 6, an error signal may be generated to indicate a possible malfunction of the system.

One feature of the present invention is that the correction control signals remain unchanged over an extended period, for example, until engine operation is discontinued. As a result, the rapidly changing engine timing corrections according to knocking limit, which are characteristic of some prior art devices, are avoided. Further it is unnecessary to provide a large safety margin in the timing adjustment signals to avoid knocking in the determination of the optimum ignition timing adjustment curves, since the system automatically adjusts for knocking by correction of these curves by use of the correction control signal.

Figure 7:
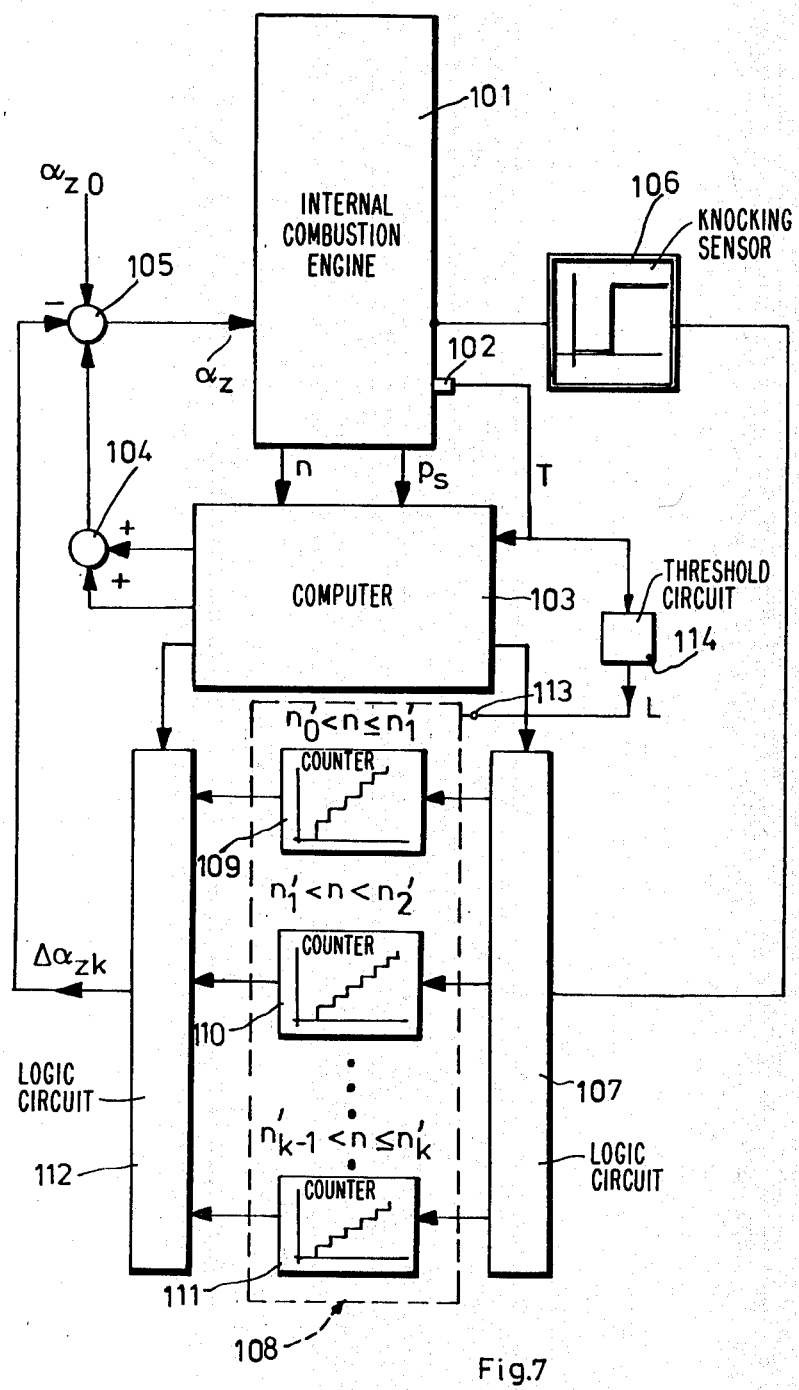
FIG. 7 is a block diagram illustrating another embodiment of an ignition timing control system in accordance with the present invention.

In the embodiment of the invention shown in FIG. 7, the internal combustion engine 101 provides output signals n and $P_s$ representative, respectively, of engine speed and intake manifold vacuum. An engine temperature sensor 102 provides an output signal T representative of engine temperature, preferably the temperature of the cylinder head. The temperature representative signal is provided to the ignition computer 103 and to threshold circuit 114, which will be further described. The system includes a first combining element 104 for adding component ignition timing adjustment signals, for example, timing adjustment signals which are a function of engine speed and timing adjustment signals which are a function of intake manifold pressure, curves of which are shown in FIGS. 5 and 6, respectively. The system further includes a second combining element 105 which combines the composite timing adjustment signal which is output from element 104 with a timing correction signal which is output from circuit 112. In the embodiment of FIG. 7, ignition computer 103 in combination with combining element 104 provides an output ignition timing adjustment signal which is selected to provide optimum engine operation without regard to the possibility of engine knocking. Thus the engine timing is advanced by a relatively large amount, and without the corrections provided by the remaining circuit elements, engine knocking might very well occur at certain speed ranges. The output control signal is selected in accordance with a curve which consists of a series of straight lines interconnecting values of ignition timing adjustments corresponding to individual speed values $n_1$, $n_2$, etc. Adjacent ones of these speed values thus define speed ranges having mean speeds $n_1'$, $n_2'$, etc.

In the event engine knocking occurs, it is detected by knocking sensor 106, which supplies a knocking signal to logic element 107. Element 107 also responds to a speed indicating signal which is supplied by ignition computer 103. According to the engine speed range, logic circuit 107 supplies counting signals to counting storage element 108. Counting storage element 108 has a plurality of counters 109, 110 and 111, each associated with a selected speed range of the engine. Each of these counters is supplied with counts when knocking occurs in its corresponding speed range, and thereby develops a count signal which is maintained and which indicates the number of correcting counts supplied to the counter by logic circuit 107. This number is representative of the correction necessary to the ignition timing adjustment signal to overcome knocking in the speed range of interest. Logic circuit 112 also responds to a speed indicating signal from ignition computer 103 and selects the count from one of counting circuits 109, 110 and 111 and supplies, in accordance with the count, an ignition timing correction signal to combining circuit 105. Element 105 combines the correction signal with the timing adjustment signal which is output from element 104 and with the ignition timing signal $\alpha_{zo}$ which is output from the engine distributor to provide a composite ignition timing signal to engine 101. Thus the ignition timing signal which is provided to engine 101 is corrected to have an ignition timing which is optimum to avoid engine knocking and also optimum for engine performance as determined by the signals generated in ignition computer 103. In the embodiment of FIG. 7 counting storage circuit 108 is provided with an initialization signal which originates in threshold circuit 114 in response to changes in engine temperature. Thus if the engine temperature sensor 102 provides an output signal indicating a change in engine temperature corresponding to a threshold value, a temperature change control signal is generated in circuit 114 which causes a resetting of all of the counters in counting storage 108 so that the timing correction signal determination process is reinitiated. The signal from circuit 114 is provided to a reset input 113 of circuit 108. Thus, when engine temperature changes by an amount which would substantially change the knocking conditions of operation, the determination of the timing correction signal is remade so that optimum engine operation can be maintained.

In a variation of the embodiment described, the renewed adaptation of the generation of the correction control signal in circuit 108 can occur without complete resetting of the counters, for example, by holding the output correction control signal of circuit 108 while a new correction control signal is being determined and set into the counters 109, 110 and 111.

Those skilled in the art will recognize that many of the functions identified as being performed by separate components in FIGS. 3 and 7 may be performed by programmed micro-processor devices.

While there have been described what are believed to be the preferred embodiments of the present invention, those skilled in the art will recognize that other and further modifications may be made thereto without departing from the spirit of the invention, and it is intended to claim all such changes and modifications as set forth within the true scope of the invention.

We claim:

1. In a method for operating a spark ignited internal combustion engine, wherein an engine timing adjustment signal is generated as a function of engine operating conditions, and wherein a timing correction signal is generated for each of a plurality of engine speed ranges in response to engine knocking, said correction signal being combined with said adjustment signal to prevent engine knocking, the improvement wherein said correction signal for a first selected speed range is generated in response to the onset of engine knocking and said correction signals for the remaining speed ranges are derived from said correction signal for said first selected speed range.

2. The method according to claim 1, wherein said correction signal for said first selected speed range is selected from a first predetermined set of fixed correction signals in response to engine knocking, and wherein said correction signals for said remaining speed ranges are selected from corresponding sets of fixed correction signals, each of said sets having the same number of fixed correction signals and each set being associated with one of said speed ranges.

3. The method according to claim 1, wherein said correction signals for each of said speed ranges have a predetermined range of correction signal values, including minimum and maximum signal values, and wherein said correction signals for said remaining speed ranges are selected to have the same ratio to the corresponding minimum and maximum values as said correction signal for said first selected speed range.

4. A system for adjusting the ignition timing of an internal combustion engine in response to knocking comprising:

a knocking sensor for generating knocking signals when the internal combustion engine knocks;

an ignition computer, responsive to supplied signals representative of engine operating conditions, including speed, and responsive to supplied correction control signals, for generating ignition timing adjustment signals, said adjustment signals including a timing correction derived from said correction control signals;

a counter, responsive to supplied counting signals, for generating said correction control signals;

logic means, responsive to the onset of said knocking signals for generating said counting signals for said counter;

and means responsive to said adjustment signals for adjusting said ignition timing.

5. A system as specified in claim 4, wherein said supplied signals representative of engine operating conditions include signals representative of intake manifold pressure, and wherein said computer has stored sets of values of timing adjustment signals including said timing correction for each value of said correction control signal and wherein said computer selects said ignition timing adjustment signal according to said speed and pressure representative signals for each supplied value of said correction control signal.

6. A system as specified in claim 4 or 5, wherein said speed representative signal and an engine temperature representative signal are supplied to said logic means and wherein said logic means generates counting signals in response to said temperature and speed signals to correct ignition timing and thereby stabilize the idle speed of the internal combustion engine when said idle drops below a preset idle speed.

7. A system as specified in claim 6, wherein said logic means is arranged to suppress generation of said counting signals in response to knocking signals or temperature signals at speeds above said idle speed and below a selected speed, whereby said correction control signal is unchanged when said engine operates in said range.

8. In a method for operating a spark ignited internal combustion engine, wherein an engine timing adjustment signal is generated as a function of engine operating conditions, and wherein a timing correction signal is generated in response to engine knocking, said correction signal being combined with said adjustment signal to prevent engine knocking, the improvement wherein the generated value of said correction signal is maintained constant until the engine temperature changes by a selected amount, whereupon a new value for said correction signal is generated.

9. A method as specified in claim 8, wherein said engine temperature is sensed in a cylinder head of said engine.

10. In a system for controlling ignition timing of an internal combustion engine to prevent engine knocking, wherein there are provided means responsive to an engine knocking signal for generating an ignition timing correction signal, the improvement, wherein there is provided means responsive to engine temperature for providing a temperature change control signal upon a predetermined magnitude of engine temperature change, and wherein said correction signal generating means generates an updated correction signal in response to said temperature change control signal.

11. In an internal combustion engine having an ignition timing apparatus for providing nominal timing control signals in accordance with the operating condition of said engine, including engine speed and load, a method for adjusting said nominal timing control signals to prevent engine knocking, comprising the steps of:

detecting the occurrence of engine knocking to develop knocking signals;

generating timing correction signals in response to said knocking signals;

storing said timing correction signals in a memory; and combining said stored timing correction signals with said nominal timing signals to develop corrected timing signals for use in providing ignition pulses to said engine.

12. Apparatus for controlling spark advance in an ignition system of an internal combustion engine, comprising:

means for generating an engine speed signal;

means for generating an engine intake vacuum signal;

means, responsive to said speed signal and said vacuum signal, for generating an ignition timing control signal;

means, responsive to engine knocking, for developing a knocking signal;

a plurality of counters, each corresponding to a selected speed range of said engine, for storing ignition timing correction signals;

first switch means, responsive to said speed signals, for selectively providing said knocking signals to one of said counters thereby to develop said correction signals;

second switching means, responsive to said speed signals, for selecting one of said correction signals in said counters;

means for combining said ignition timing control signals and said selected correction signal to form a corrected timing control signal; and means responsive to said corrected timing control signal for controlling said spark advance.

13. The method of claim 11 and further comprising the step of generating an error signal upon the occurrence of a predetermined maximum correction signal.

14. In a method as set forth in claim 11, the improvement wherein the storing of said correction signals in memory is terminated by the stopping of the engine.

15. The method of claim 11, 13 or 14 and further comprising the steps of:

storing said timing correction signals in said memory by speed ranges; and generating said corrected timing signals in each speed range in which said knocking signals are generated.

16. The apparatus of claim 12 wherein said counters, said first and second switching means, and said combining means are combined to form a self-contained means that may be disconnectably connected to the ignition system.

* * * * *